L. J. SANKER.
WIND DEFLECTOR FOR AUTOS.
APPLICATION FILED JULY 21, 1919.
1,359,843.
Patented Nov. 23, 1920.
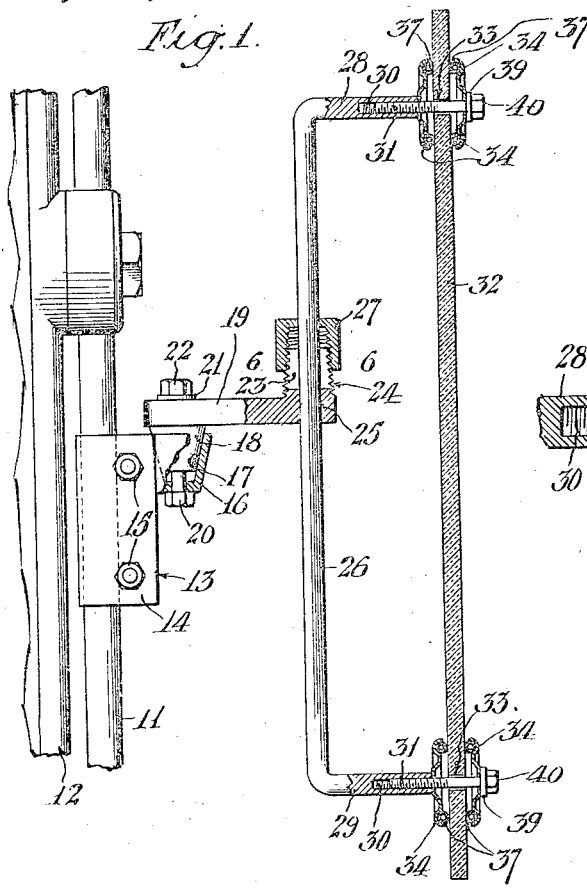
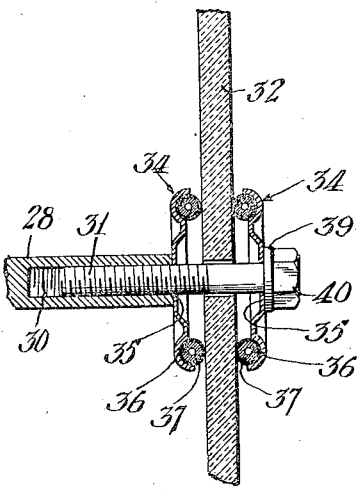
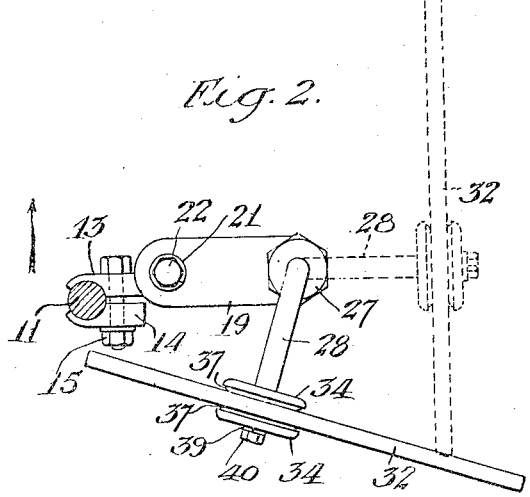
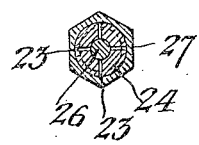
Inventor
Leonard J. Sanker
by Graham + Davis
Attorneys

UNITED STATES PATENT OFFICE.

LEONARD J. SANKER, OF LOS ANGELES, CALIFORNIA, ASSIGNOR TO FINDLEY E. ANDREANI, OF LOS ANGELES, CALIFORNIA.

WIND-DEFLECTOR FOR AUTOS.

1,359,843.

Specification of Letters Patent. Patented Nov. 23, 1920.

Application filed July 21, 1919. Serial No. 312,447.

*To all whom it may concern:*

Be it known that I, LEONARD J. SANKER, a citizen of the United States, residing at Los Angeles, in the county of Los Angeles, State of California, have invented a new and useful Wind-Deflector for Autos, of which the following is a specification.

My invention relates to wind deflectors for automobiles, being more particularly side deflectors or wings placed at each side of the wind shield on automobiles. Wind shields as ordinarily used on automobiles are not of sufficient width to prevent head wind from entering the sides of the car, and the principal object of my invention is to produce auxiliary deflectors of simple form and construction which can be readily attached to the common windshield.

Another object of my invention is to produce side deflectors in which the glass forming the wind receiving surface is resiliently but firmly mounted on the supporting means, the resilient members being of simple and efficient form and of such construction as to resist the deteriorating action of the weather.

Other objects and advantages will appear hereinafter from the following description and drawings.

Referring to the drawings, which are for illustrative purposes only,

Figure 1 is a side elevation partly in section showing a wind deflector embodying a form of my invention.

Fig. 2 is a plan view of the wind deflector shown in Fig. 1.

Fig. 3 is an enlarged vertical sectional view of one of the glass supports.

Fig. 4 is a face view of one of the cushioning rings used.

Fig. 5 is a face view of the ring material, parts of which are broken away to show the structure, and Fig. 6 is a sectional plan view on line 6—6, Fig. 1.

11 designates the side frame of the windshield 12, such windshield being of any well known construction as commonly used on automobiles. 13 designates a bracket which is formed to engage the windshield frame as shown in Fig. 2, the bracket having a plate 14 which engages the opposite side of the windshield frame, the plate 14 being clamped to the bracket by means of suitable bolts 15.

Formed on the bracket 13 is a cup 16 having a conical recess 17 in which is rotatably mounted a cone 18 formed and depending downwardly from an arm 19. The cone 18 is held in adjusted position in the cup 16 by means of a bolt 20 provided with a washer 21 and a nut 22. On the outer end of the arm 19 is formed a conical boss 24, the boss 24 having a central bore 25 extending vertically therethrough to receive the wing bar 26. The boss is exteriorly threaded to receive an interiorly threaded nut 27 and the boss is also split as indicated at 23 so that when the nut 27 is tightened on the threaded boss the upper end of the boss grips the wing bar 26 as more fully hereinafter described.

The wing bar 26 is U shaped as clearly shown in Fig. 1, the vertical or central portion terminating in outwardly extending upper and lower ends 28 and 29 respectively. These ends are bored as indicated at 30 and interiorly threaded to receive a bolt 31. 32 designates the wing which consists of a plate of glass provided with perforations or holes 33 to receive the bolt 31. On each side of the plate of glass is placed a disk 34. The disks 34 are formed of sheet metal, being dished out in the central portion as indicated at 35 and being formed with an annular seat 36. The annular seat 36 receives a cushioning ring 37 which in the form shown is split as indicated at 38. The cushioning ring engages the plate of glass and the disks 34 hold the rings 37 so that the glass is supported between the cushioning rings in the disks. The inner disk abuts against the end of the arm on the wing bar and the outer disk in each pair abuts against a washer 39 against which is seated the head 40 of the bolt 31.

As clearly shown in Fig. 3, the glass is resiliently held between the cushioning rings of the inner and outer disks, the perforation or hole 33 in the glass being of slightly larger diameter than the bolt 31 so that there is no engagement between the glass and the bolt. Each cushioning ring is made with a metal core consisting of wire indicated at 42, a rubber covering 43 on the wire, and a water proof fabric covering 44 over the rubber, this latter covering being of vital importance as the rubber or resilient member of the cushioning ring is protected from the weather, therefore it does not deteriorate which would permit the glass to become loose in its supports. The wire core retains the shape of the cushioning ring so that it fits properly in the annular seat in the disk.

The wind deflector above described, it is understood, is made in pairs, there being one deflector mounted on each side of the windshield, the cup and cone connection between the bracket and swinging arm permitting an adjustment of the arm with relation to the windshield, a still further or secondary adjustment of the wing itself being permitted by the conical boss and nut connection of the wing bar to the arm 19. The peculiar construction just noted, that is, the conical boss and nut through which the wing bar extends is of such a nature that when the nut 27 is tightened on the boss 24 a vertical movement of the bar 26 is prevented but the bar may be rotated in the boss by manipulation of the wing 32, thereby permitting angular adjustment of the wing, the wing being a sufficient distance from the wing bar to permit the leverage of force exerted on the wing bar to rotate the same in the boss 24, this connection, however, being of sufficient tightness to prevent movement of the wing due to wind pressure.

As shown in Fig. 2 the wing 32 has been moved into a position with relation to the windshield so that the head wind will be deflected sufficiently sidewise and rearwardly to practically insure that the head wind does not enter the side of the car, the dotted line position showing a position in which the wing may be placed when it is not desired to deflect the wind, the direction of movement of the car being in the direction indicated by the arrow shown in Fig. 2.

What I claim is:—

1. A wind deflector for autos comprising a bracket arranged to engage the windshield frame, a conically shaped cup formed on said bracket, an arm, a cone on said arm rotatably mounted in said cup, an exteriorly threaded conical boss on said arm split at its outer end and having a bore extending vertically therethrough, a U shaped wing bar extending through the bore in said boss, a nut on said boss, and a plate of glass mounted on the ends of said bar.

2. A wind deflector comprising a supporting structure arranged to engage the windshield frame, and means for securing a plate of glass to the supporting structure, said means consisting of bolts secured to the supporting structure, a pair of disks on each bolt having annular seats formed therein, a cushioning ring in the annular seat in each disk, and a plate of glass between the cushioning rings in each pair of disks, said plate having holes therethrough to receive said bolts, the holes being of larger diameter than the bolts.

3. A wind deflector comprising a supporting structure arranged to engage the windshield frame, and means for securing a plate of glass to the supporting structure, said means consisting of bolts secured to the supporting structure, a pair of disks on each bolt having annular seats formed therein, a cushioning ring in the annular seat in each disk, each cushioning ring comprising a resilient member and a weather resisting cover over the resilient member, and a plate of glass between the cushioning rings in each pair of disks, said plate having holes therethrough to receive said bolts, the holes being of larger diameter than the bolts.

4. A wind deflector for autos comprising a bracket arranged to engage the windshield frame, an arm pivotally mounted on said bracket, an exteriorly threaded conical boss on said arm split at its outer end and having a bore extending vertically therethrough, a wing bar extending through the bore in said boss, a nut on said boss, and a plate of glass mounted on the wing bar.

In testimony whereof, I have hereunto set my hand at Los Angeles, California, this 15th day of July, 1919.

LEONARD J. SANKER.